US009996533B2

(12) United States Patent
Kanayama et al.

(10) Patent No.: US 9,996,533 B2
(45) Date of Patent: Jun. 12, 2018

(54) QUESTION ANSWERING SYSTEM USING MULTILINGUAL INFORMATION SOURCES

(71) Applicant: INTERNATIONAL BUSINESS MACHINES CORPORATION, Armonk, NY (US)

(72) Inventors: Hiroshi Kanayama, Tokyo (JP); Risa Kawanaka, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 14/870,730

(22) Filed: Sep. 30, 2015

(65) Prior Publication Data

US 2017/0091175 A1    Mar. 30, 2017

(51) Int. Cl.
*G06F 17/28*    (2006.01)
*G06F 17/27*    (2006.01)
*G06F 17/30*    (2006.01)

(52) U.S. Cl.
CPC .......... *G06F 17/289* (2013.01); *G06F 17/275* (2013.01); *G06F 17/30719* (2013.01)

(58) Field of Classification Search
CPC ............ G06F 17/30669; G06F 17/289; G06F 17/30389; G06F 17/30401; G06F 17/30554; G06F 17/30637; G06F 17/2755; G06F 17/2854; G06F 17/3071; Y10S 707/99934; Y10S 707/99935
See application file for complete search history.

(56) References Cited

U.S. PATENT DOCUMENTS

| 7,146,358 | B1* | 12/2006 | Gravano | G06F 17/30864 |
| 8,224,857 | B2 | 7/2012 | Doganata et al. | |
| 8,407,042 | B2 | 3/2013 | Cancedda | |
| 2004/0064305 | A1* | 4/2004 | Sakai | G06F 17/2872 704/9 |
| 2007/0266020 | A1* | 11/2007 | Case | G06F 17/3071 |

(Continued)

FOREIGN PATENT DOCUMENTS

WO    WO2011088053 A2    7/2011

OTHER PUBLICATIONS

Isozaki, H. et al., "NTT's Japanese-English Cross-Language Question Answering System," Proceedings of NTCIR-5 Workshop Meeting, Dec. 2005. (pp. 1-8).

(Continued)

*Primary Examiner* — Angela A Armstrong
(74) *Attorney, Agent, or Firm* — Tutunjian & Bitetto, P.C.; Vazken Alexanian

(57) ABSTRACT

A method of question answering from multilingual information sources is disclosed. The present invention discloses a method, a computer system and a program product for selecting an information source language of an information source, the method comprising; receiving a question; analyzing the question to obtain a category information of at least one word included in the question; obtaining a word included in the category information as estimated topic or region related to the question; determining a candidate for an information source language using the estimated topic or region; and selecting the information source language and corresponding information sources for retrieving documents to generate an answer of the question.

14 Claims, 14 Drawing Sheets

(56) References Cited

U.S. PATENT DOCUMENTS

| | | | |
|---|---|---|---|
| 2012/0078895 A1* | 3/2012 | Chu-Carroll | G06F 17/30637 |
| | | | 707/728 |
| 2013/0006954 A1* | 1/2013 | Nikoulina | G06F 17/2818 |
| | | | 707/706 |
| 2014/0149446 A1* | 5/2014 | Kuchmann-Beauger | ................. |
| | | | G06F 17/30389 |
| | | | 707/763 |

OTHER PUBLICATIONS

Neumann, G. et al., "Experiments on Robust NL Question Interpretation and Multi-layered Document Annotation for a Cross-Language Question/Answering System," Lecture Notes in Computer Science, vol. 3491, Sep. 2005. (pp. 1-12).

Stolcke, A. et al., "Dialogue Act Modeling for Automatic Tagging and Recognition of Conversational Speech," Computational Linguistics, vol. 26, No. 3, Sep. 2000. (pp. 1-34).

* cited by examiner

| Region | Language |
|---|---|
| Tokyo | Japanese |
| NewYork | English |
| Floria | English |
| Mumbai | Hindi |
| Damascus | Alabian |
| Munchen | Germany |
| ... | ... |

*Fig.8*

QUESTION ANSWERING SYSTEM USING MULTILINGUAL INFORMATION SOURCES

BACKGROUND

Technical Field

The present invention relates to a question answering technology and, more particularly, to a question answering technology to generate answers by information searches among hybrid languages.

Description of the Related Art

Nowadays, a computer system has been improved by its language applicability and most computer systems may be operated under a multi-lingual environment. In such a computer system, a question answering system is widely known and the conventional question answering system could generate answers in the same language as a question language. In addition, an information source for generating the answer was that accumulating information provided in the same language as the question language. Hereafter, the language of the information source is referred to simply as an IS language. Such conventional question and answer systems (hereafter simply referred to a QA system), such as a simple background technology, have been described in following literatures:

(1) Neumann, Günter, and Bogdan Sacaleanu. "Experiments on robust NL question interpretation and multi-layered document annotation for a cross-language question/answering system." Multilingual Information Access for Text, Speech and Images. Springer Berlin Heidelberg, 2005. Pages 411-422. (http://research.nii.ac.jp/~ntcadm/workshop/OnlineProceedings5/data/CLQA/NTCIR5-CLQA-IsozakiH.pdf);

(2) Isozaki, Hideki, Katsuhito Sudoh, and Hajime Tsukada. "NTT's Japanese-English cross-language question answering system." Proc. of NTCIR-5 Meeting. 2005 (http://research.nii.ac.jp/~ntcadm/workshop/OnlineProceedings5/data/CLQA/NTCIR5-CLQA-IsozakiH.pdf);

(3) Stolcke, Andreas, et al. "Dialogue act modeling for automatic tagging and recognition of conversational speech." Computational linguistics 26.3 (2000): 339-373 (http://arxiv.org/pdf/cs/0006023.pdf) and (4) International Patent Publication WO2011/088053A2.

The conventional QA system usually searches contents using queries in the question language while targeting the information source provided in the IS language, which is the same language as that of the question. However, Japanese Wikipedia contains more information about Japanese temples than English Wikipedia even though the question has been issued in English. Additionally, English Wikipedia contains more information about American movies than does Japanese Wikipedia even though the question has been issued in Japanese.

When an English speaker inputs a question about Japanese temples in an English language, a mono-lingual QA system can handle this question by searching the information source provided in English but not the information source provided in Japanese; nevertheless Japanese information source may contain and provide much more contents expected proper for an answer of the question.

In turn, when a Japanese speaker wants to issue a question about an American movie, a mono-lingual Japanese QA system accepts this question in Japanese. However, the language of information sources to be searched has been restricted to that provided in Japanese. Nevertheless, English information sources may contain more documents related to the American movie. In the conventional environments described above, the QA system may have difficulty in finding more right and/or relevant answers from the information source provided in the different language from the question language.

SUMMARY

According to a preferred aspect of the present invention, a computer-implemented method for selecting an information source language of an information source may be provided. The method may comprise:

receiving a question;

analyzing the question to obtain a category information of at least one word included in the question;

obtaining a word included in the category information as an estimated topic or region related to the question;

determining a candidate for an information source language using the estimated topic or region; and selecting the information source language and corresponding information sources for retrieving documents to generate an answer of the question.

According to another preferable aspect of the present invention, determining a candidate for an information source language includes determining a candidate for an information source language by referring to at least one of a topic-language table and a region-language table with the estimated topic or region as a retrieval key.

According to yet another preferable aspect of the present invention, determining a candidate for an information source language includes determining a plurality of information source language candidates in a case where a plurality of words from categories of words included in the question are respectively obtained as the estimated topic or region related to the question and ranking the plurality of information source language candidates based on appearance frequency of each information source language candidate as language related to the estimated topic or region in the topic-language table or a region-language table.

According to still yet another preferable aspect of the present invention, the computer-implemented method may further comprise:

searching information sources in different languages for a document including the estimated topic or region and determining the candidate for an information source language depending on average numbers of retrieved documents from each information source.

According to still yet another preferable aspect of the present invention, the computer-implemented method may further comprise:

classifying a word vector including at least one word and a frequency appearing in the question as to the information source language by using a question-information source language model trained by question and answer results.

According to still yet another aspect of the present invention, a computer system comprising a processor and a memory storing a program of instructions executable by the processor to perform one or more methods described herein also may be provided. Additionally, according to another aspect of the present invention, a program product comprising a computer readable storage medium having program instructions executable by a computer to perform one or more methods described herein also may be provided.

According to the aspects of the present invention, a question answering system using multilingual information sources, which may provide a technology to prioritize the information source languages relevant to topics and regions in the question and to search answers from the information source provided in the prioritized information source language, may be provided.

BRIEF DESCRIPTION OF THE DRAWINGS

FIG. 8 shows an embodiment of a region-language table.

DETAILED DESCRIPTION

Figure 1:
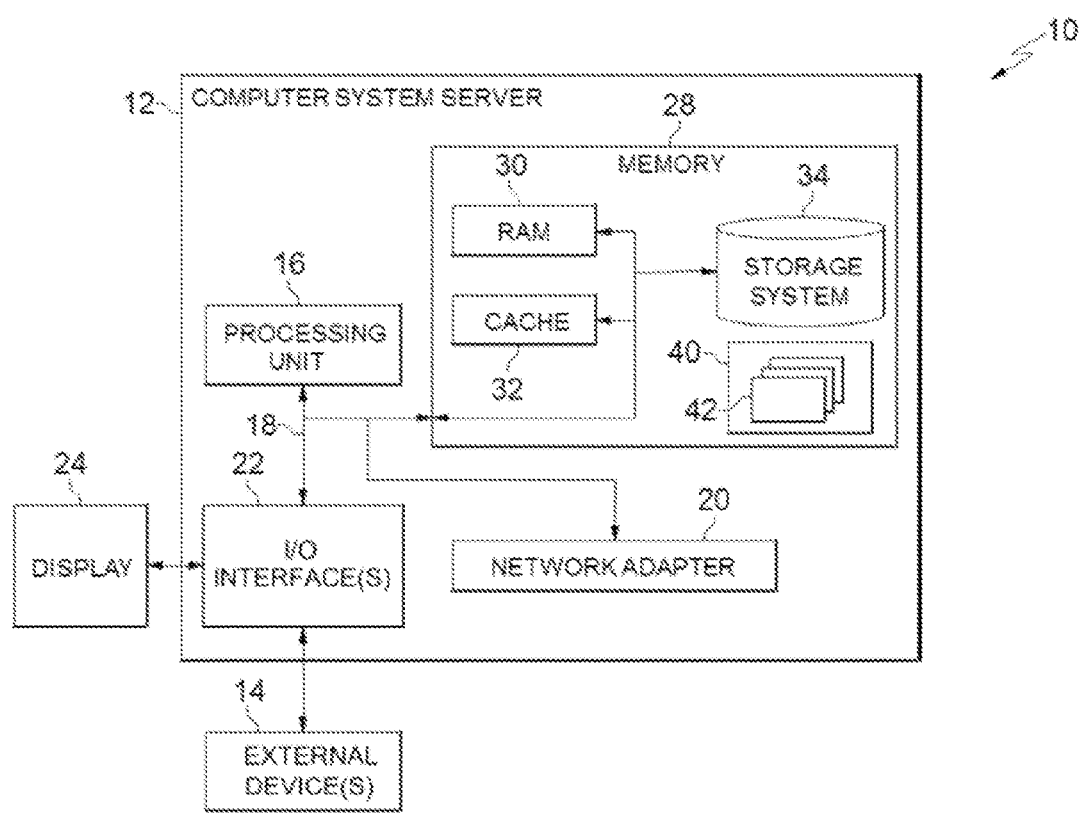
FIG. 1 shows a schematic of an example of a cloud computing node.

Now, the present invention will be described with references to particular embodiments. However, the present invention should not be limited to the described embodiments. It is understood in advance that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:
On-demand self-service: a cloud consumer can unilaterally provision computing capabilities, such as server time and network storage, as needed automatically without requiring human interaction with the service's provider.
Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:
Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:
Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein.

Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations.

Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, a computer system/server 12 in cloud computing node 10 is shown in the form of a general-purpose computing device. The components of computer system/server 12 may include, but are not limited to, one or more processors or processing units 16, a system memory 28, and a bus 18 that couples various system components including the system memory 28 to the processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, a storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
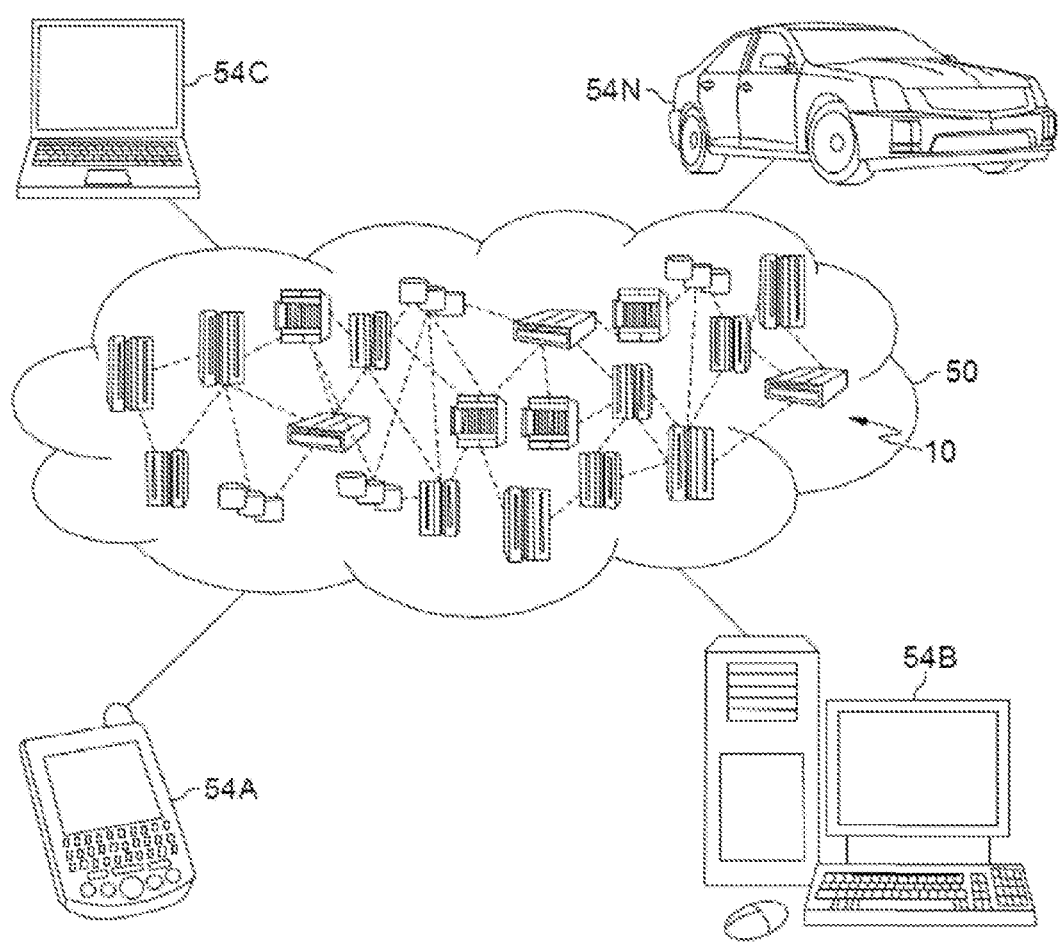
FIG. 2 shows an illustrative cloud computing environment.

Referring now to FIG. 2, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows the cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
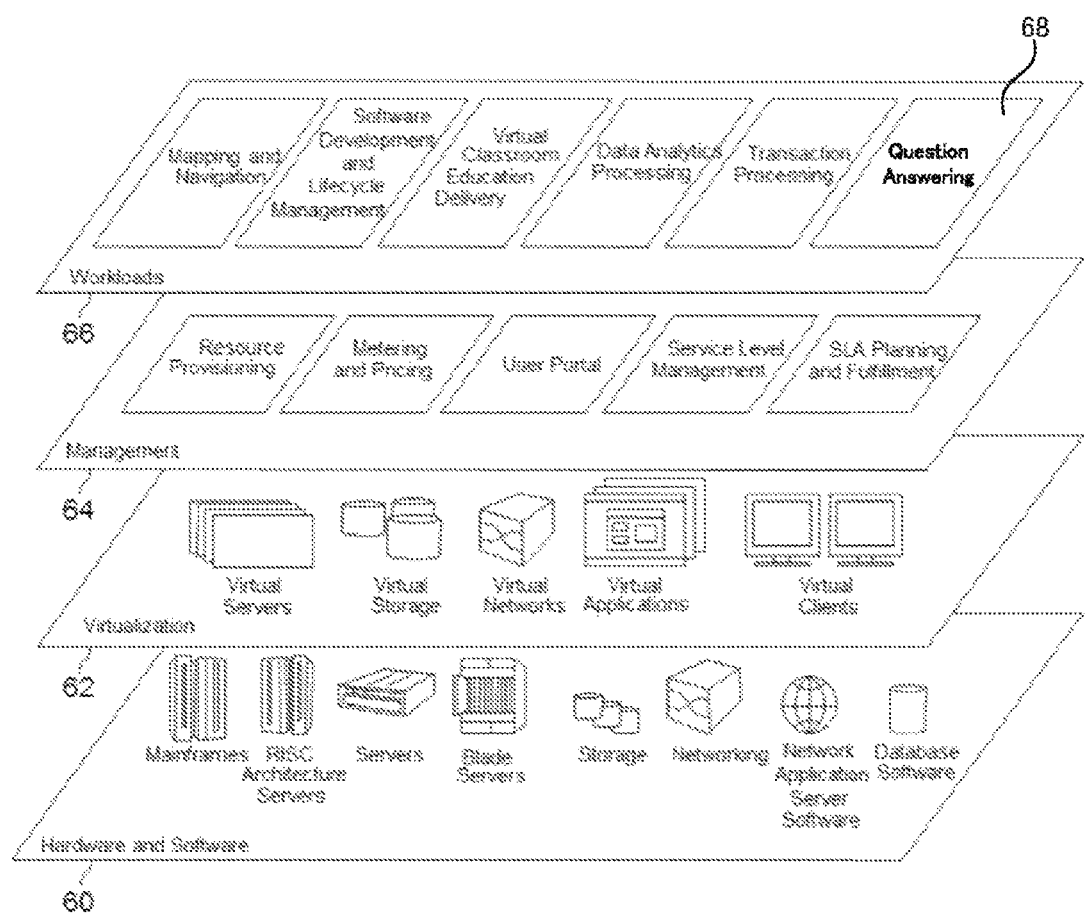
FIG. 3 shows a set of functional abstraction layers provided by a cloud computing environment (FIG. 2).

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

A hardware and software layer 60 includes hardware and software components. Examples of hardware components include: mainframes; RISC (Reduced Instruction Set Computer) architecture based servers; storage devices; networks and networking components. In some embodiments, software components include network application server software. A virtualization layer 62 provides an abstraction layer from which the following examples of virtual entities may be provided: virtual servers; virtual storage; virtual networks, including virtual private networks; virtual applications and operating systems; and virtual clients.

In one example, a management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

A workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the question and answer technology of embodiments of the present invention 68.

Figure 4:
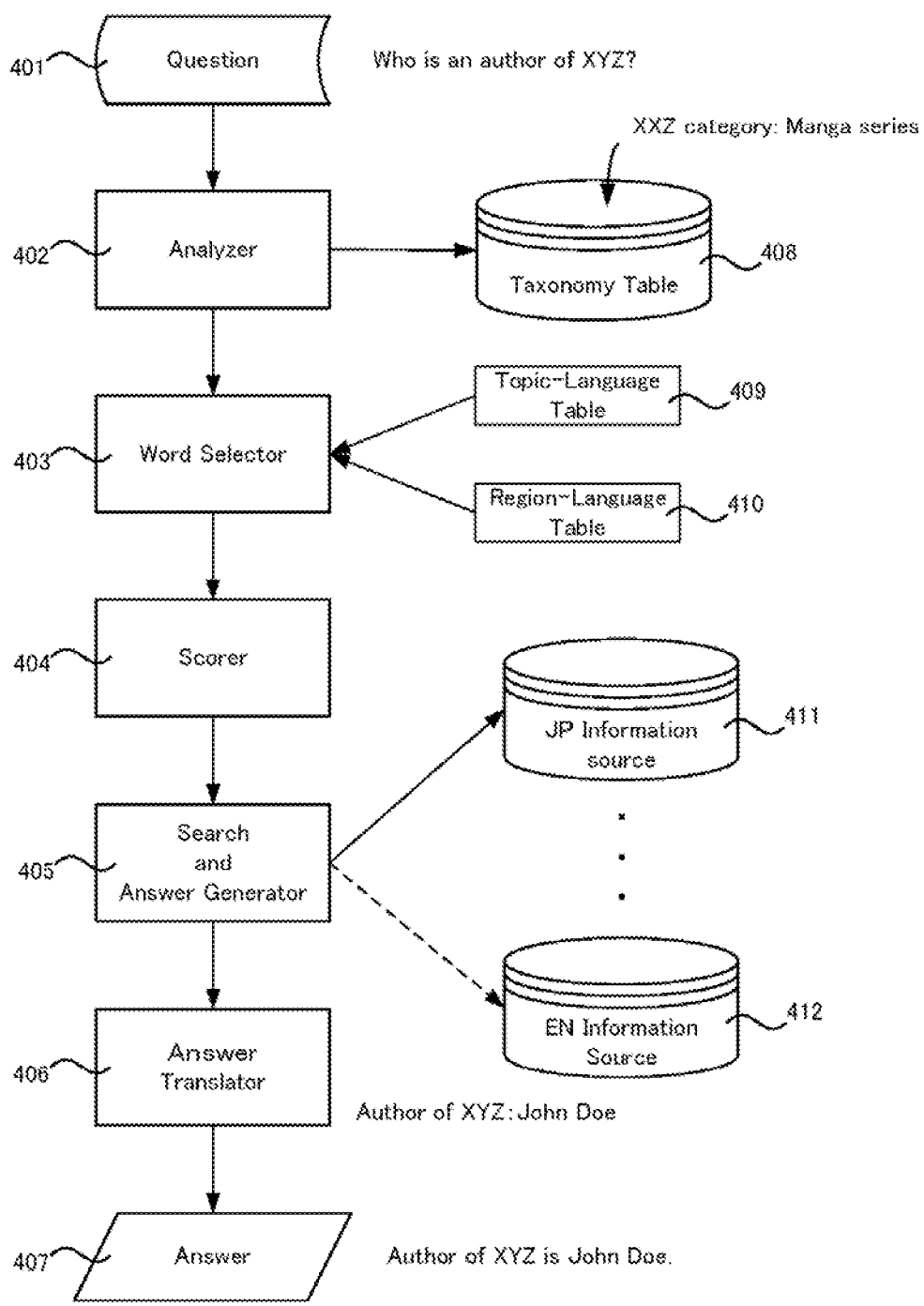
FIG. 4 shows a functional block diagram of an embodiment of a QA system.

Referring to FIG. 4, one embodiment of the present invention will be explained. FIG. 4 shows a functional block diagram of the embodiment of the QA system 400. The functional block of FIG. 4 may be implemented in a computer by running a program including computer executable program codes with processor or processors 16.

In the present description, the term "multilingual" means that the QA system generates an answer to an input question by searching an information source and/or information sources provided by different languages depending on gist or point of the input question.

A QA system 400 may include an analyzer 402, a word selector 403 and a scorer 404. The analyzer 402 receives a question 401 such as "Who is an author of XYZ?" through a network or other adequate input devices. The analyzer 402 analyzes the question text by using morphological analysis, named entity recognition, and/or other techniques used in the conventional QA systems. The analyzer 402 then selects a set of words that appeared in the question 401 by using the above analysis result. An example definition to select the output set of words is selecting proper nouns and nouns in the question based on the morphological analysis and named entity recognition results, but other definitions that extract verbs, adjectives, and/or adverbs may exist.

Then, the analyzer 402 refers a taxonomy table 408 to determine one or more categories of each of the words selected in the above process. The taxonomy database 408 stores pairs of words in one or more categories, such as "XYZ: TV shows in Japan" and "XYZ: Manga series". The taxonomy table 408 may be generated prior to the processing of the present embodiment by collecting pairs of those words and their categories from appropriate databases such as Wikipedia (Trademark) in various languages.

Figure 9:
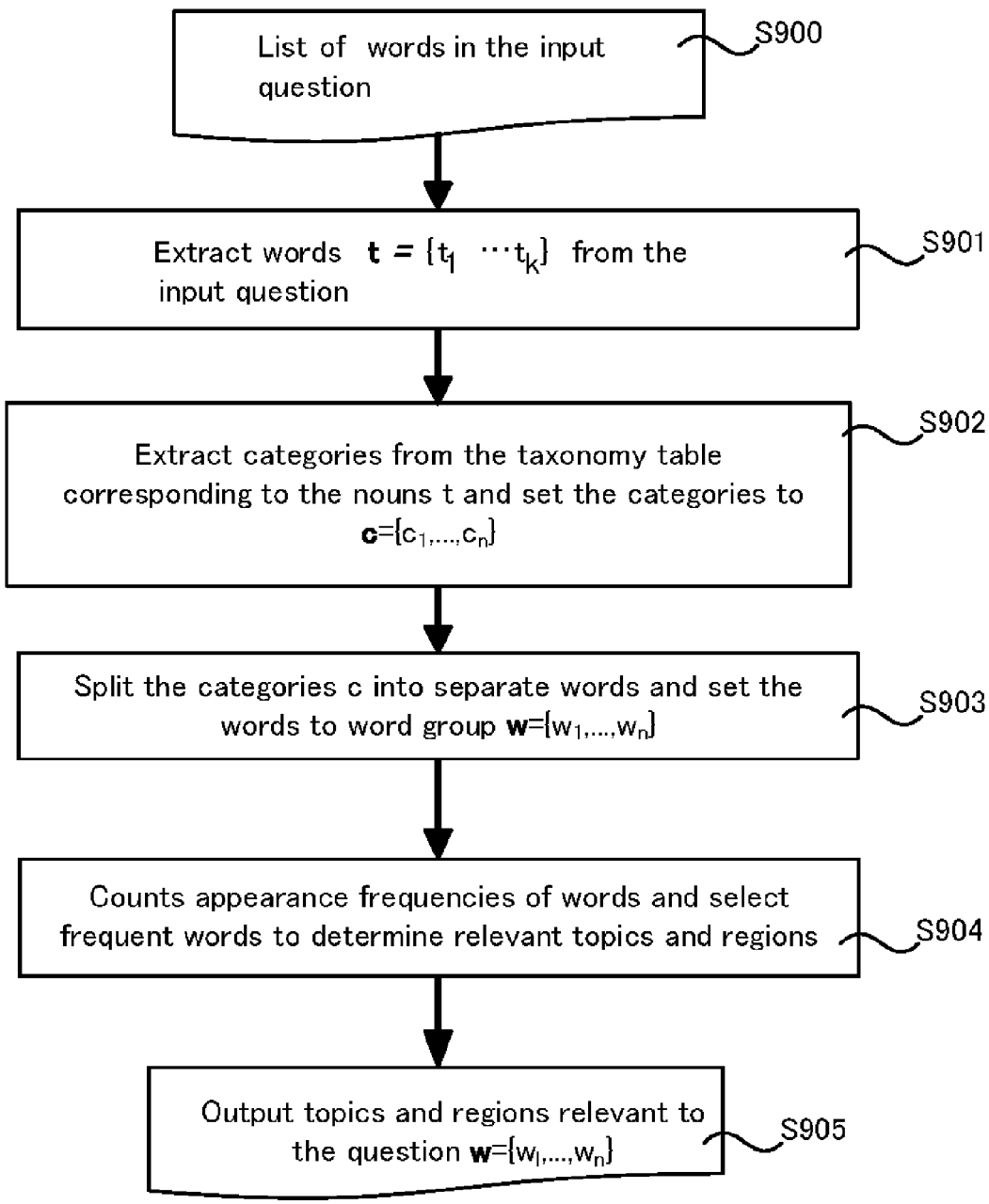
FIG. 9 shows detailed processing of a sub-process for determining the topic and the region from the categories.

After the one or more categories of each selected word from the question 401 are determined, the analyzer 402 determines a set of topics and regions that are expected to be relevant to the question 401 by using the above categories, which is explained later in detail by referring the FIG. 9. Each of the topic and region are represented as a word and thus the set of topics and regions are obtained as a set of words. This set of words is sent to the word selector 403 as the output of the analyzer 402.

For each of the above words, the word selector 403 determines a language that is expected to be used when writing about the topic represented by the word more than other languages or is mainly used in the region represented by the word as a candidate for the information source language. The candidate language determination is done by referring a topic-language table 409 and a region-language table 410, which is explained later in detail. The word selector 403 outputs pairs of topics and languages and/or pairs of regions and languages to the scorer 404.

Here, the topic-language table 409 stores pairs of a word that represents a topic and a language that is expected to be used in the information source containing more documents about the paired topic compared with other information sources. The topic-language table 409 may relate topics in the question to languages relevant to the topics. The region-language table 410 stores pairs of a word that represents a street, a city, or another type of geographical places or regions and a language that is mainly used in the paired geographical place or region. The region-language table 409 may relate regions in the question to languages relevant to the regions. Particular embodiments of these data structures will be described later.

In one embodiment, in which the question is "Who is an author of XYZ?", and the analyzer 402 extracts "XYZ" and founds its categories from the taxonomy table 408 as "Manga series" and "TV shows in Japan" and estimates the related topics and regions as {"Manga", "Japan", "TV"}, the word selector 403 looks for topics and regions named "Manga", "Japan", and "TV" from the topic-language table 409 and the region-language table 410 and founds "Manga: Japanese" and "TV:English" topic entries from the topic-language table 409 and "Japan:Japanese" region entry from the region-language table 410.

Here, gist of the question issued by the questioner may be determined by relations among category, topic, region, and languages and/or any combinations as well as each of the above features included in a question and the selection of IS languages as well as IS may be determined depending on the gist of the question.

The scorer 404 calculates a score of each language in the input pairs of topics or regions and languages that are transferred from the word selector 403; in one embodiment, for example, the scorer 404 may use frequencies of languages in the above input as scores of them and may select the most frequent language as an IS language. In this embodiment, the word selector 403 outputs pairs of topics and languages {"Manga: Japanese", "TV: English"} and pairs of regions and languages {"Japan: Japanese"}. The scorer 404 calculates scores as Japanese=2 and English=1 by counting those frequencies in the input of the component. Then the scorer 404 determines that the IS language used for the question 400 is Japanese which got the highest score.

The QA system of FIG. 4 further comprises a search and answer generator 405 and an answer translator 406. The scorer 404 sends the IS language used for the question to the search and answer generator 405 and the search and answer generator 405 uses a machine translation engine to translate the question into the IS language if the original language of the question is different from the IS language. Then the search and answer generator 405 converts the question in the IS language into a search query to search and retrieve contents relevant to the question from the information source in the IS language. In the example for the question "Who is an author of XYZ?", a Japanese (JP) information source 411, not an English (EN) Information source 412, is used for generating answers of the question even though the input question is provided in English. The search and answer generator 405 then generates and scores candidate answers of the input question by using the same techniques as existing QA systems.

Once the search and answer generator 405 obtains a set of candidate answers and if the IS language is different from the original language of the question, the search and answer generator 405 sends the candidate answers to the answer translator 406 to translate them into the language of the question; in the embodiment of FIG. 4, the candidate answer is assumed to "John Doe" in Japanese, and the answer translator 406 translates the Japanese candidate answer into English as "John Doe" and returns as an answer 407.

The answer 407 may be returned to a user who has requested the question 401 as a language format as well as a voice processed sound format and the user can obtain the relevant information about the question using the relevant information source. The information sources may be any databases available through the network and one example for such database is Wikipedia (Trademark) which contains a large amount of information about people, places and other named entities in different languages, but not limited to, a database of an enterprise, government and/or any organization can be used.

Figure 5:
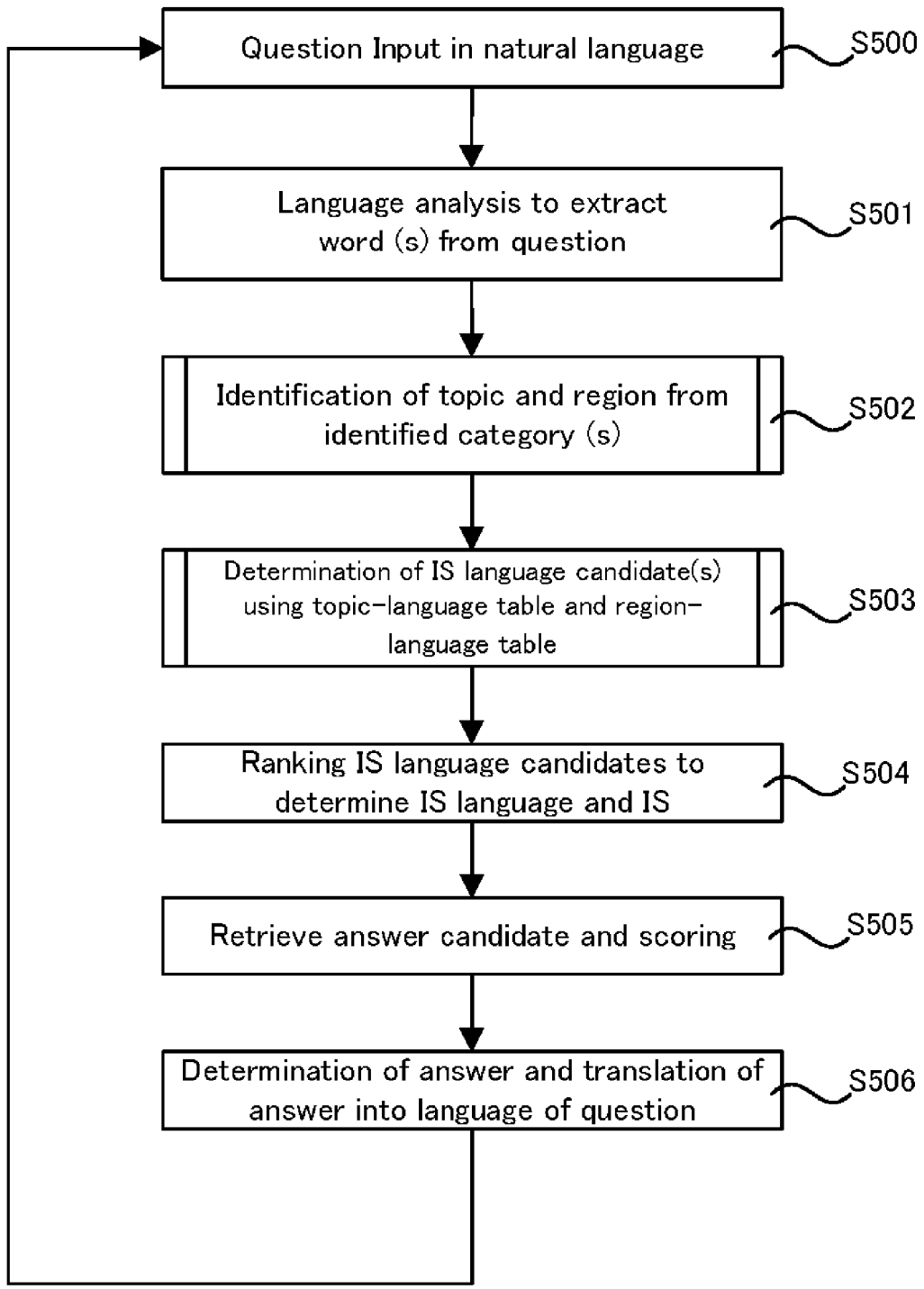
FIG. 5 shows a flowchart of a process executed by the QA system shown in FIG. 4.

FIG. 5 shows a flowchart of a process executed by the QA system 400 shown in FIG. 4. The process of FIG. 5 starts from step S500 with receiving the question input in the natural language by the analyzer 402; the natural language input may be a text format and a text may be obtained from a speaking voice using known voice recognition applications. Then the analyzer 402 performs analysis of the language of the question to extract one or more words present in the question in step S501 by using conventional language analysis procedure including the morphology analysis.

Then in step S502, the analyzer 402 identifies the category of at least one word by referring to the taxonomy table 408 and determines a topic and/or a region that are expected to be relevant to the question 401 by using the above category. Then, in step S503, the word selector 403 determines one or more candidates for IS language using the topic-language table 409 and the region-language table 410. The word selector 403 outputs a group of topics-language pairs p={$p_i$: $l_i$, ..., pa:la}; $p_i$ is an i-th topic, and $l_i$ is an i-th language which is expected to describe the i-th topic better than other languages. The word selector 403 also generates a group of region-language pairs r={$r_i$:$l_i$, ..., $r_b$:$l_b$}; here, $r_i$ is an i-th region, and $l_i$ is an i-th language, which is mainly used in the i-th region.

In step S504, the scorer 404 ranks one or more the IS language candidates using the group "p" and the group "r". The scorer 404 determines the IS language, for example, as the language having the top appearance frequency among the languages appearing in the group "p" and "r" to obtain corresponding IS in step S504.

The search and answer generator 405 then dispatches a search query to the information source provided in the determined IS language to retrieve answer candidates and scores the candidates according to methods of conventional search engine in step S505. The scoring may be done by using known technology, for example, keyword matching between the question and documents retrieved, but not limited to, any other scoring method may be possible.

In step S506, the answer is, for example, determined as the document having the highest relevancy to the question by the search and answer generator 405. Then, the document may be translated into the language of the question from the IS language by the answer translator 406. The translated answer is then returned to a user apparatus which issued the question to complete a question-answer cycle.

Figure 6:
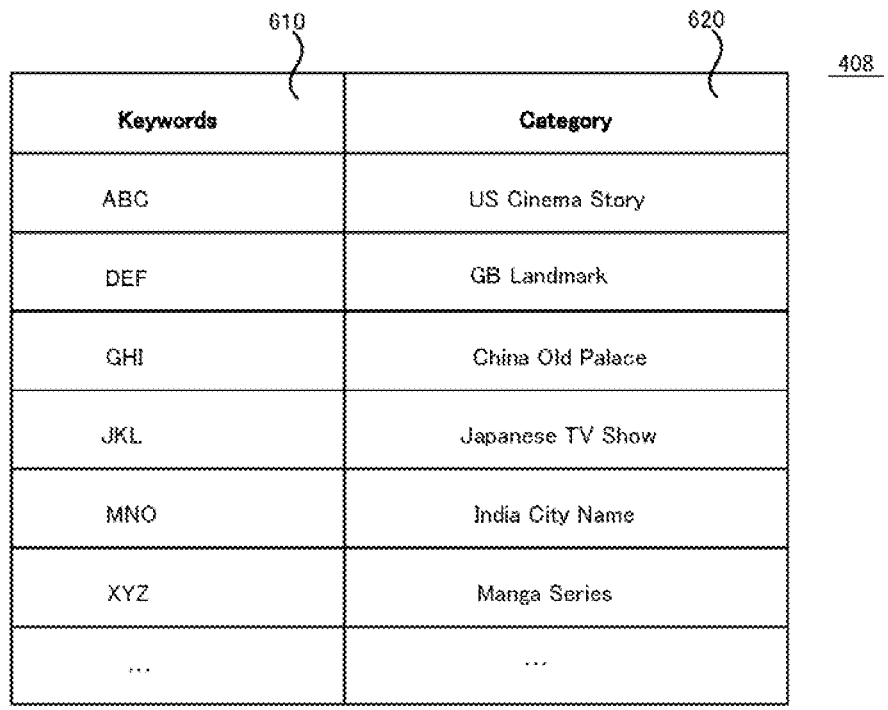
FIG. 6 shows an embodiment of a taxonomy table.

Now, with referring to FIGS. 6-8, embodiments of data structures will be described. FIG. 6 shows an embodiment of the taxonomy table 408. The taxonomy table 408 lists keywords 610 and categories 620 thereof for enabling reference of the topic-language and the region-language tables 409, 410. The taxonomy table 408 may be prepared beforehand and may be updated periodically by an appropriate search robot system from free database systems, such as Wikipedia (Trademark).

Figure 7:
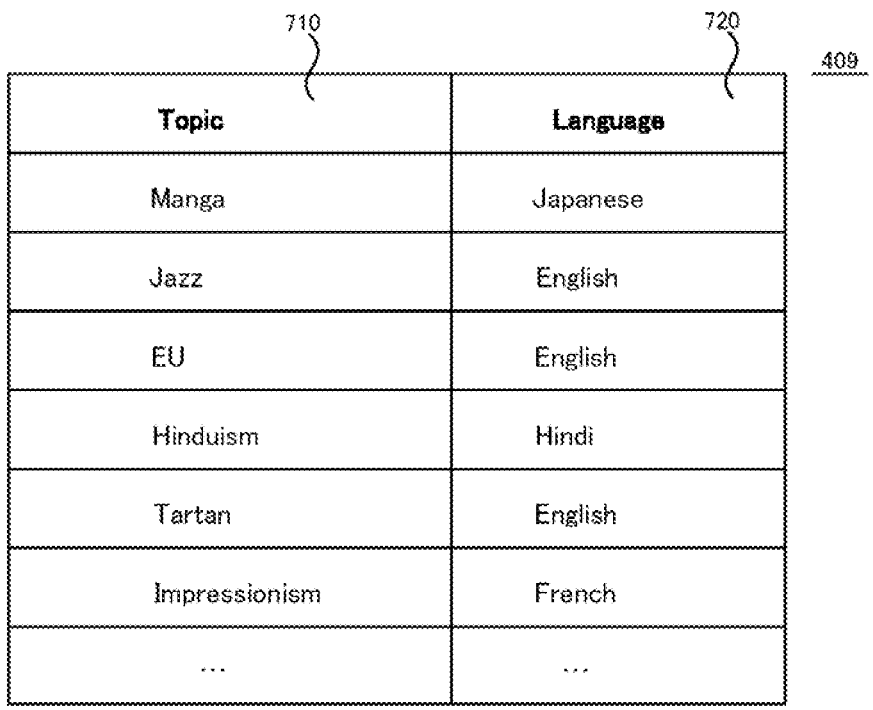
FIG. 7 shows an embodiment of a topic-language table which lists topics and relevant languages.

FIG. 7 shows an embodiment of the topic-language table 409 which lists a topic 710 and a language 720 that is expected to be used when describing about the topic more than other languages 720. The topic-language table 409 may be prepared by hand, or may be generated by counting a number of Wikipedia entries mapped to each category (topic) in all language versions, comparing those numbers between languages by using inter-language link given in each Wikipedia category and listing a category and a language having most linked entries, but not limited to, other known method may not be excluded. For an exemplary embodiment may be referred to the processing and function of the search and answer generator 405.

FIG. 8 shows an embodiment of the region-language table 410. The region-language table 410 links regions 810 to languages 820. The region-language table 410 may be effective when the categories retrieved from the taxonomy table 408 include regional information such as Japan, United States of America, French, Spanish, Great Britain etc. The region-language table may be prepared beforehand by finding Wikipedia entries that mapped to countries, cities or other categories meaning geographical regions and parsing their infoboxes that often contain language information used in the region, or just extracting words meaning any languages from the Wikipedia entries, but not limited to, any other known method may be possible. When there are several languages in a particular region, the language of the region may be selected to the most popular language in such region such as Hindi in India. The topic-language table 409 and the region-language table 410 may be independently and/or cooperatively applied for determining the IS language depending on the categories retrieved from the taxonomy table 408.

Now again referring to FIG. 5, the sub-processes of steps S502 and S503 will be detailed. FIG. 9 shows the detailed processing of the sub-process S502 for determining the topic and the region from the categories executed by the analyzer 402. The analyzer 402 starts from step S900 and lists the words in the input question by the language analysis. In step S901, the analyzer 402 extracts the words and sets the extracted words to a noun group $t=\{t_1, \ldots, t_k\}$. Then, in step S902, categories corresponding to the extracted words are set to the category group $c=\{c_1, \ldots, c_n\}$ by the analyzer 402 using the taxonomy table 408. Each of the categories c is represented by noun phrases.

Then, in step S903, the analyzer 402 splits the categories in the category group as discrete words $w_0=\{w_1, \ldots, w_m\}$ which includes words relating to topics and the regions relevant to the categories. Further, in step S904, the analyzer 402 counts frequencies of the words in the word group $w_0$ and in step S905 the analyzer 402 extracts N most frequent words $w=\{w_1, \ldots, w_n\}$ as estimated topics and regions related to the input question.

For selection of the estimated topics and regions, it is possible to select words that appear in all the categories stored in the taxonomy table 408 more than a given threshold, but not limited to, any known method may be used.

Figure 10:
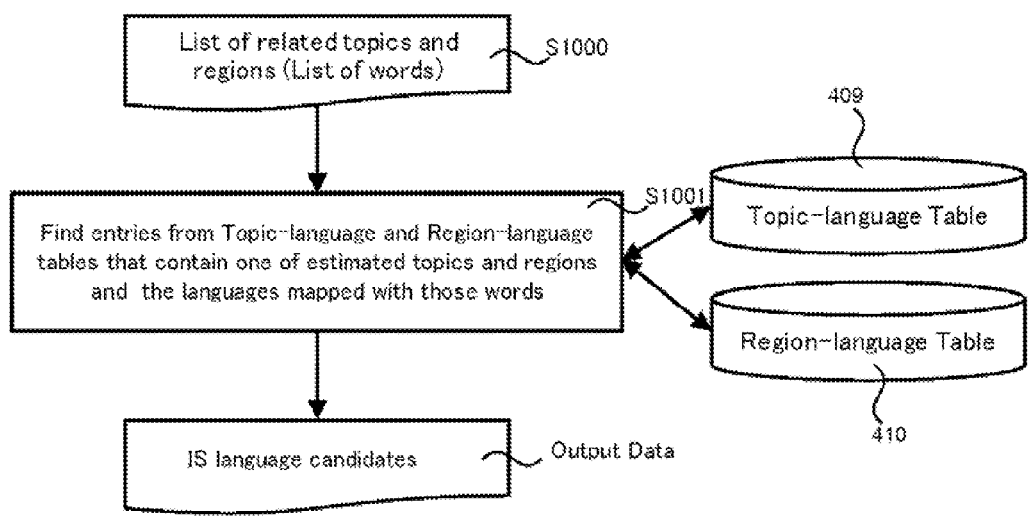
FIG. 10 shows details of the sub-process of step S503 in FIG. 5 for determining the language relevant to the topics and regions in the group $w_o$.

FIG. 10 shows details of the sub-process of step S503 in FIG. 5 for determining the language relevant to the estimated topics and regions w. In step S1000, the word selector 403 retrieves words from the word group w defined in step S905 and then searches the topic-language and the region-language tables 409, 410 with the words as retrieval keys in step S1001 to generate IS language candidate groups $L=\{L_1, \ldots L_n\}$. Here, $L_j$ refers the languages found by looking up the topic-language and the region-language tables 409, 410 in step S1001. In this step, several languages in the language group L may be retrieved depending on the words in the group w. Then, the IS language candidate may be output as the data as shown in FIG. 10.

After the sub-process of FIG. 10, i.e., step S503 in FIG. 5, the scorer 404 calculates an appearance frequency of the same language to determine the most relevant language L to the question in the group L. Determination of the most relevant language may be accomplished by selecting the top frequent language, in this embodiment, but is not limited to any other known method. When languages having the same appearance frequency are found, the QA system may provide answers obtained by the information sources corresponding to the languages having the same appearance frequency. Alternatively, it may be possible to provide weights to the topic-language table 409 and the region-language table 410.

The QA system has determined the language relevant to the question as the IS language and the QA system in step S505 to accomplish information retrieval from the information source which contains contents provided in the IS language. In this embodiment, if the question was input as the natural language, including many words not relevant to the IS language, it is possible to determine the most relevant IS language by omitting unnecessary words and selecting the most relevant language.

Figure 11:
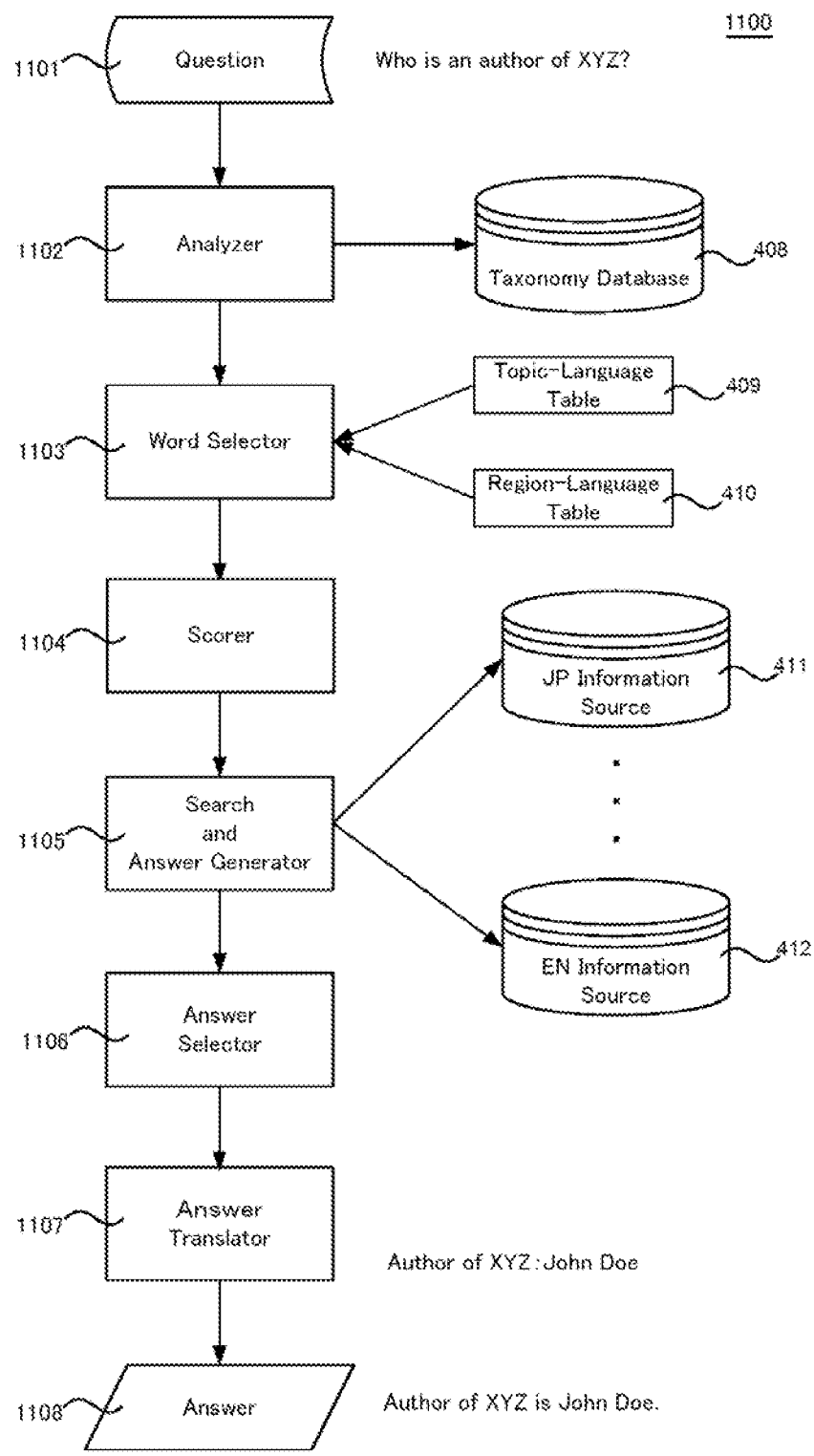
FIG. 11 shows a functional block diagram of another embodiment of the QA system.

FIG. 11 shows a functional block diagram of another embodiment of a QA system 1100. In the embodiment of FIG. 11, the QA system 1100 searches a plurality of information sources and the IS language will be determined by information amounts retrieved rather than one information source with the language determined by a scorer 1104. The functions of an analyzer 1102 and word selector 1103, a search and answer generator 1105 and an answer translator 1107 are similar to the first embodiment shown in FIG. 4, and then detailed explanation will be omitted herein below.

In the embodiment of FIG. 11, the scorer 1104 lists-up the languages relevant to the categories as described in the first embodiment; however, the scorer 1104 sends the languages as IS language candidates to the search engine 1105 without determining the IS language to a particular language. The search engine 1105 searches information sources for documents relevant to the question after it is translated into each of IS language candidates that the scorer 1104 has acknowledged to the search engine 1105.

In this embodiment, an answer selector 1106 may select the language relevant to the question depending on numbers of documents retrieved from each of information sources. The answer selector 1106 determines the IS language and the information source from which much more documents have been retrieved. The answer selector 1106 may select the documents to be subjected to the translation by the answer translator 1107 out of the richest retrieved results and language. Once the information source is determined, the retrieved documents are ranked as the same method described in the first embodiment by using known technology, for example, keyword matching between the question and documents retrieved. The answer may be determined as the document having the highest keyword matching score, but is not limited to any other scoring method. The answer translator 1107 receives the document for the answer to the question and translates the document to generate an answer 1108 in the language of the question.

The embodiment shown in FIG. 11 may generate the answer from the information source which stores much documents of the language relevant to the gist or the point of the question and then the answer to the question may be given using the most reliable contents in available databases while the computation time and/or hardware requirement for the search engine may be increased.

Figure 12:
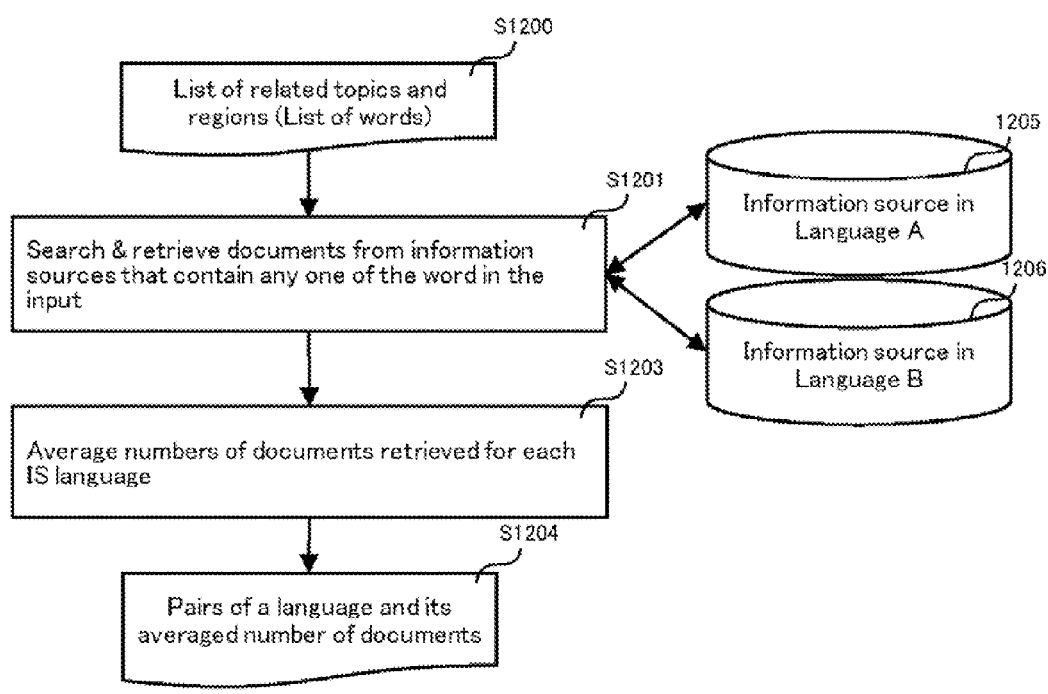
FIG. 12 shows a flowchart of a process executed by the QA system shown in FIG. 11.

FIG. 12 shows a flowchart of a process executed by the QA system 1100 shown in FIG. 11. The process starts from step S1200 and the analyzer 1102 lists the estimated topics and regions relevant to the question to form the word group $w=\{w_j, \ldots, w_k\}$. Then in step S1201, the search and answer generator 1105 executes multiple searches in the word base and the language relevant to the word and retrieves documents including one or more words in the word group w from different information sources 1205, 1206 in different languages relating to the word group w. The retrieved results may be each stored per the language used for the search.

In step S1203, the process calculates average numbers of the documents for each of search words in the word group {w} for every language searched. As the result, pairs of the language and average number of the retrieved documents are generated in step S1204. The QA system 1100 may select the documents from the search result containing the richest documents about the question as well as the IS language. In this embodiment, the information source and the IS language may be simultaneously determined and the documents to be the answer may be retrieved without knowing the target language such that this embodiment may be the most consistent to the question while requiring parallel searches or searching overhead.

Figure 13:
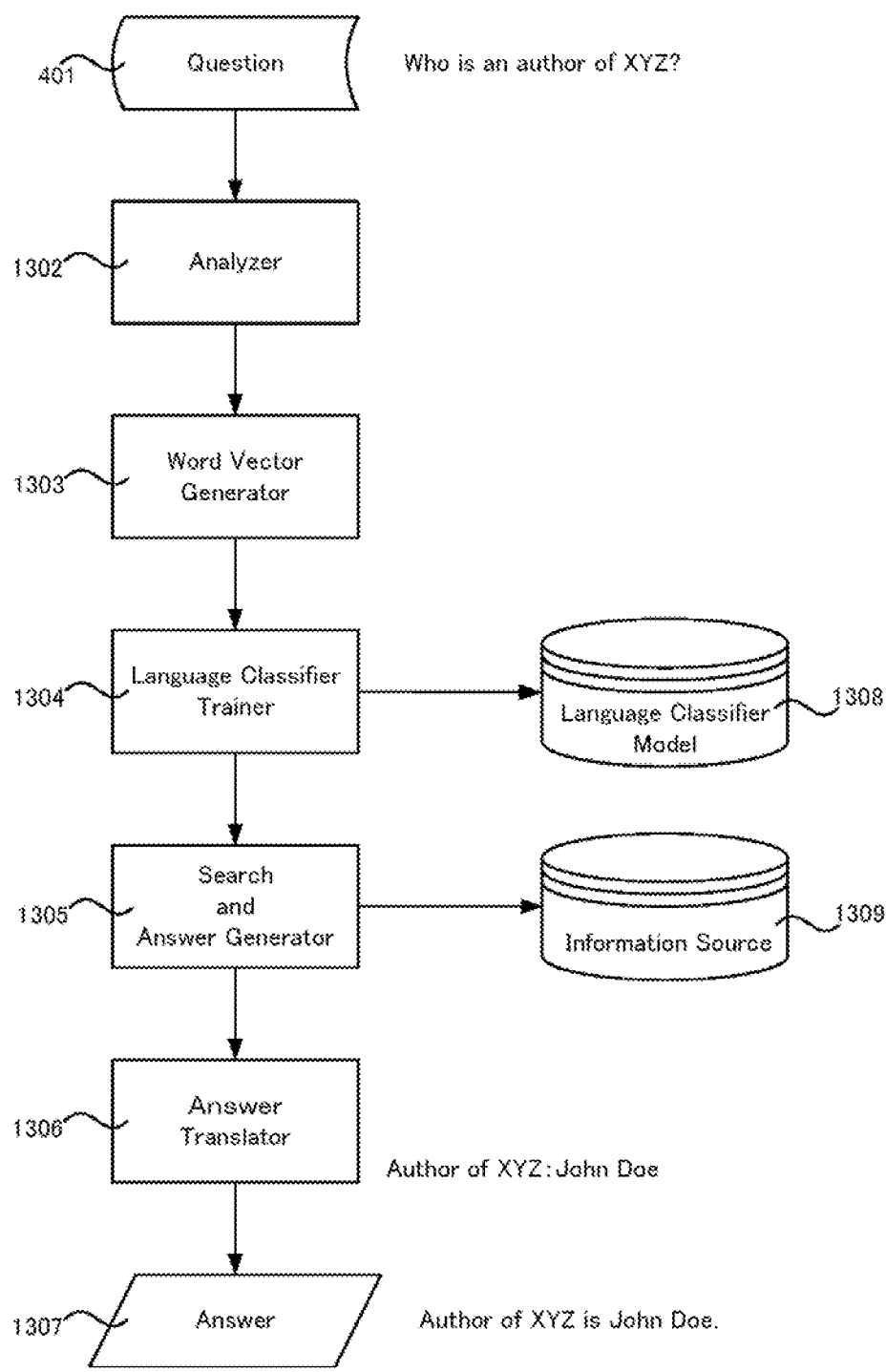
FIG. 13 shows a functional block of another embodiment of the QA system.

FIG. 13 shows a functional block of another embodiment of a QA system 1300. Among the functional blocks in FIG. 13, an analyzer 1302, a search engine 1305, an answer translator 1306, and an answer 1307 are similar to the first embodiment and the second embodiment and therefore, further details will be omitted.

The third embodiment comprises a word vector generator 1303 and a language classifier trainer 1304. The word vector generator 1303 generates a word vector which contains words and appearance frequency of the corresponding words, i.e., W={$word_1$, $frequency_1$, ..., $word_n$, $frequency_n$} from the word determined by the analyzer 1302. A language classifier trainer 1304 determines a relevant language from the word vector W by classifying the word vector W using a language classifier model 1308.

The search and answer generator 1305 searches an information source 1309 in the determined language. The language classifier model 1308 may be prepared beforehand by learning results of conventional single-language QA system. Here, the formation of the language classifier model 1308 will be described. According to the embodiment shown in FIG. 13, determination of the IS language and IS may become more and more precise with less time consumption as the training of the language classifier model 1308 is advanced.

Figure 14:
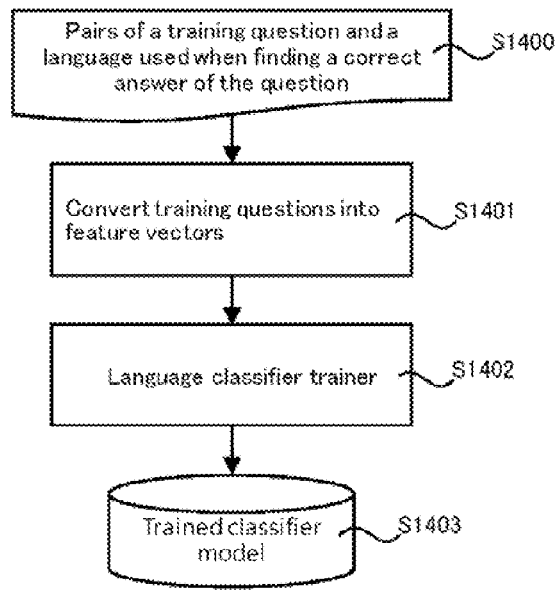
FIG. 14 shows a process for forming a question-IS language model.

FIG. 14 shows a process for forming the question-IS language model. The process starts from step S1400 and the process first prepares pairs of a training question and a language and searches answers in the paired language. When the answer is correct and/or relevant to the question, the process records and stores such pairs in the language classifier model 1308. Then the analyzer 1302 in step S1401 converts words in the question to the word vector comprising words and the appearance frequencies of the words. In addition, the language which returned correct and/or relevant answer is sent together with the word vectors. The word vectors are stored in the language classifier model 1308 per the same language for training the language classifier model 1308, S1402.

The language classifier trainer 1304 may be implemented with a conventional support vector machine or a conventional logistic regression algorithm. The training of the language classifier trainer 1304 may be accomplished by using the word vectors as the variable and the paired language as the object function according to the algorithms implemented to the language classifier trainer 1304. After the training of the language classifier trainer 1304 is completed, the language classifier model 1308 is established in step S1403.

Figure 15:
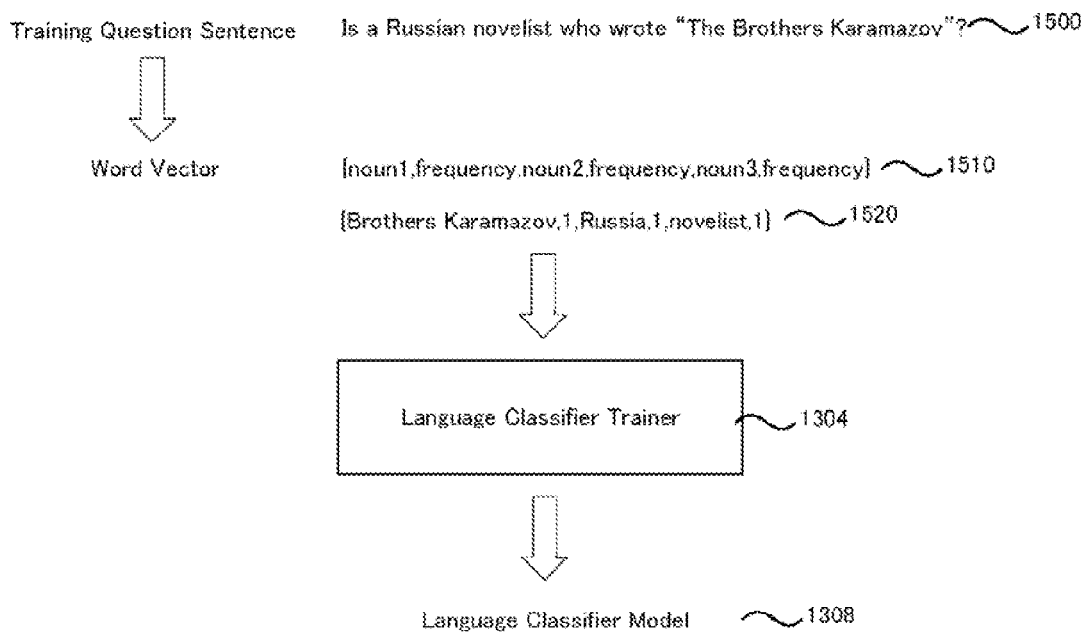
FIG. 15 shows a schematic illustration of the process of FIG. 14.

FIG. 15 shows a schematic illustration of the process of FIG. 14. In FIG. 15, a training question sentence 1500 is "Who is the Russian novelist writing "The Brothers of Karamazov?"". The word vector generator 1303 generates the word vector in a general form 1510; in a particular embodiment for the training question sentence 1500, a word vector 1520 is {(The Brothers of Karamazov, 1), (Russia, 1), (novelist, 1)}, as shown in FIG. 15. When the training question sentence 1500 can be correctly answered by a conventional single language QA system that uses Russian information source, the word vector 1520 is linked to the language Russian in the training data. A set of pairs of a word vector and a language like shown above is the input to the language classifier trainer 1304 to learn the most likelihood relations between the word vectors and the languages according to the implemented algorithms as the language classifier model 1308.

Figure 16:
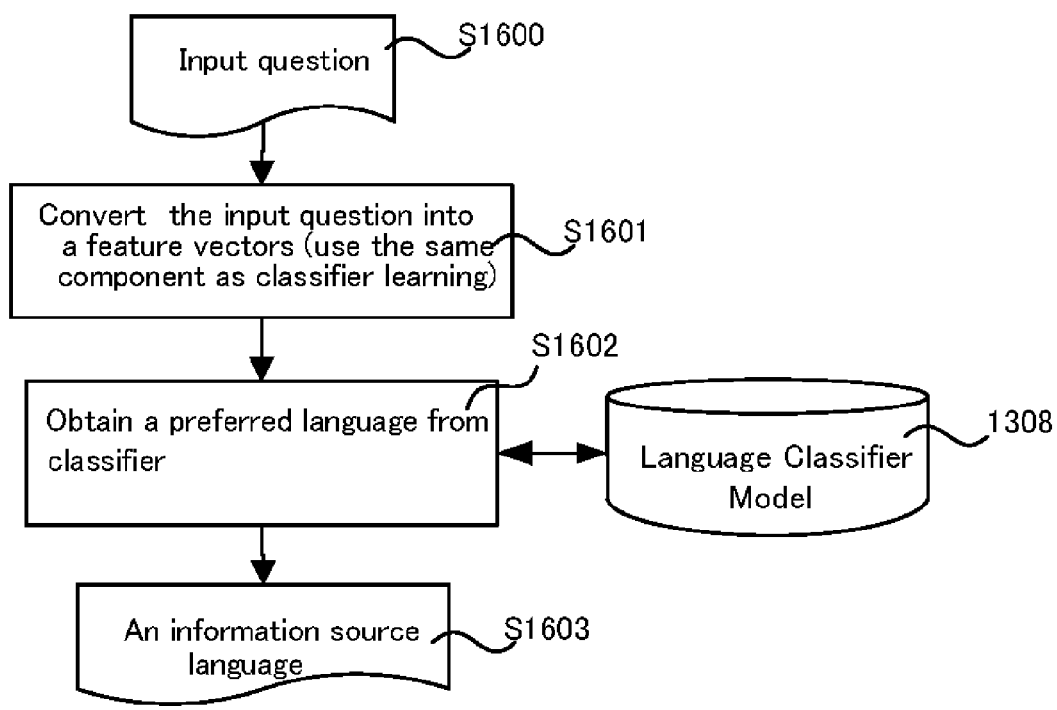
FIG. 16 shows an embodiment of a process of the QA system from receiving of the question to determining the IS language.

FIG. 16 shows an embodiment of a process of the QA system 1300 from receiving of the question to determination of the IS language. The process of FIG. 16 starts from step S1600 to receive the input question. Then the analyzer 1302 analyzes the question and the word vector generator 1303 generates the word vector in step S1601, which is the feature vector of the question, using a word template used for the training of the language classifier model 1308. When the case that the words which are not listed in the word template are present, the word may be separately analyzed by the process of the first and second embodiments and the results of such analysis may be incorporated to the result of the language classifier trainer 1304.

In step S1602, the word vector is input to the language classifier trainer 1304 to refer to the language classifier model 1308 and to obtain the preferred most likelihood language to address to the question. Then this preferred most likelihood language is set as the IS language in step S1603. Thereafter, the search and answer generator 1305 searches the IS prepared by the determined IS language to retrieve the documents for generating the answer 1307.

Further another embodiment of the present invention, the word vector for new question is once obtained, an inner product of the new word vector and the stored word vectors by training may be computed so as to estimate similarity of the new word vectors to the trained word vectors. Depending on the similarities, i.e. when the value of the inner product is higher than a predetermined threshold, the IS language for new question is determined to the language including the trained word vector giving the higher inner product.

As for business applicability of the present embodiments, the embodiments may be applicable as an internet search engine in a global company. When most of internet pages in Japan subsidiary is written in Japanese and English pages are much less than the Japanese contents or quite few or no English contents are present, according to the present embodiments, English speaking users in the subsidiary can access to both Japanese and English contents and can obtain English answer without regarding the availability of English contents.

Other business applicability may be a product search engine for international online shopping. When an online shopping company sells diverse genres of products, the products should have redundant product descriptions written in many languages. By using the present embodiments, the company may provide a product search system that accepts sentences describing requests or demands of end users as the input thereto and that returns a list of products as the answers by analyzing those product descriptions in the same language with the request or demands of the end users.

The present embodiments of the present invention may also accept a question that is transcribed from the speech input, as well as may return a question by a computer-synthesized voice.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers.

A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for selecting an information source language of an information source, the method comprising:
   receiving a question;
   analyzing the question to obtain a category information of at least one word included in the question;
   obtaining a word included in the category information as an estimated topic or region related to the question;
   determining a candidate for an information source language using the estimated topic or region, by classifying a word vector, using at least one of a support vector machine and a logistic regression algorithm, including at least one word and a frequency of the word appearing in the question as to the information source language using a question-information source language model trained by a question and answer result; and
   selecting the information source language and corresponding information sources for retrieving documents to generate an answer of the question.

2. The computer-implemented method as recited in claim 1, wherein determining a candidate for an information source language includes determining a candidate for an information source language by referring to at least one of a topic-language table and a region-language table with the estimated topic or region as a retrieval key.

3. The computer-implemented method as recited in claim 2, wherein determining a candidate for an information source language includes determining a plurality of information source language candidates in a case where a plurality of words from categories of words included in the question are respectively obtained as estimated topic or region related to the question and ranking the plurality of information source languages candidates based on appearance frequency of each information source language candidate as language related to the estimated topic or region in the topic-language table or a region-language table.

4. The computer-implemented method as recited in claim 1, wherein determining a candidate for an information source language comprises:
   searching information sources in different languages for a document including the estimated topic or region; and
   determining the candidate for an information source language depending on average numbers of retrieved documents from each information source.

5. The computer-implemented method as recited in claim 1, wherein the computer executable method provides cloud computing capabilities.

6. A computer system for selecting an information source language of an information source, the computer system comprising a processor and a memory, storing program codes, making the processor execute:
   receiving a question;
   analyzing the question to obtain a category information of at least one word included in the question;
   obtaining a word included in the category information as an estimated topic or region related to the question;
   determining a candidate for an information source language using the estimated topic or region, by referring to at least one of a topic-language table and a region-language table with the estimated topic or region as a retrieval key and by classifying a word vector, using at least one of a support vector machine and a logistic regression algorithm, including at least one word and a frequency of the word appearing in the question as to the information source language using a question-information source language model trained by a question and answer result; and
   selecting the information source language and corresponding information sources for retrieving documents to generate an answer of the question.

7. The computer system as recited in claim 6, wherein determining a candidate for an information source language includes determining a plurality of information source language candidates in a case where a plurality of words from categories of words included in the question are respectively obtained as estimated topic or region related to the question and ranking the plurality of information source languages candidates based on appearance frequency of each information source language candidate as language related to the estimated topic or region in the topic-language table or a region-language table.

8. The computer system as recited in claim 6, wherein determining a candidate for an information source language comprises:
   searching information sources in different languages for a document including the estimated topic or region; and
   determining the candidate for an information source language depending on average numbers of retrieved documents from each information source.

9. The computer system as recited in claim 6, wherein the computer system provides cloud computing capabilities.

10. A non-transitory program product comprising a media including computer program codes embodied therewith, the computer program codes making a computer execute selecting an information source language of an information source, the computer program codes comprising:
    receiving a question;
    analyzing the question to obtain a category information of at least one word included in the question;
    obtaining a word included in the category information as an estimated topic or region related to the question;
    determining a candidate for an information source language using the estimated topic or region, by classifying a word vector, using at least one of a support vector machine and a logistic regression algorithm, including at least one word and its frequency in the question as to the information source language by using a question-information source language model trained by question and answer results; and
    selecting the information source language and corresponding information sources for retrieving documents to generate an answer of the question.

11. The program product as recited in claim 10, wherein determining a candidate for an information source language includes determining a candidate for an information source language by referring to at least one of a topic-language table and a region-language table with the estimated topic or region as a retrieval key.

12. The program product as recited in claim 10, wherein determining a candidate for an information source language includes determining a plurality of information source language candidates in a case where a plurality of words from categories of words included in the question are respectively obtained as estimated topic or region related to the question and ranking the plurality of information source language candidates based on appearance frequency of each information source language candidate as language related to the estimated topic or region in the topic-language table or a region-language table.

13. The program product as recited in claim 10, wherein determining a candidate for an information source language comprises:
   searching information sources in different languages for a document including the estimated topic or region; and
   determining the candidate for an information source language depending on average numbers of retrieved documents from each information source.

14. The program product as recited in claim 10, wherein the program product provides cloud computing capabilities.

* * * * *